United States Patent

Yao

[15] 3,684,899

[45] Aug. 15, 1972

[54] CAPACITIVE STEERING NETWORKS

[72] Inventor: Ying Luh Yao, Manville, N.J.

[73] Assignee: Radio Corporation of America

[22] Filed: July 9, 1965

[21] Appl. No.: 470,868

[52] U.S. Cl. ....................307/291, 307/246, 307/247

[51] Int. Cl. ........................H03k 17/00, H03k 3/286

[58] Field of Search.....307/88.5, 291, 292, 247, 246; 328/206, 195, 196

[56] References Cited

UNITED STATES PATENTS 2,885,574 5/1959 Hoesch, Jr.................307/88.5

2,997,605 8/1961 Fortini......................307/88.5

3,046,413 7/1962 Clapper.....................307/88.5

3,069,565 12/1962 Van Ness..................307/88.5

*Primary Examiner*—John Zazworsky

*Attorney*—John V. Regan

[57] ABSTRACT

A steering network employing first and second clock switching transistors having their emitters connected in common to a clock pulse source with first and second capacitors each connected between a different base electrode and a point of reference potential is described. In addition, clock signal responsive means provides charge paths for the capacitors under the selective control of input signal responsive means.

14 Claims, 6 Drawing Figures

|  | (1) | (0) |
|---|---|---|
| SET | +3.3 | 0 |
| RESET | 0 | +3.3 |

INVENTOR.
YING LUH YAO
BY John V. Regan
Attorney

INVENTOR.
YING LUH YAO
BY John V. Regan
Attorney

CAPACITIVE STEERING NETWORKS

This invention relates to electrical circuits and, in particular, to active steering networks.

Steering networks are used in conjunction with flip-flops (bistable multivibrators) to steer applied input signals to one or the other of a flip-flop's input terminals, as in triggerable flip-flop, counter and shift register application. Most known steering networks have one or more characteristics which are undesirable in integrated circuits. For example, they require capacitors of very large value, especially in low power, low speed flip-flops. Further, the capacitors are "floating" in the sense that neither plate of a capacitor is held at a fixed potential, e.g., circuit ground. In a monolithic circuit, large valued capacitors are undesirable because the required surface area varies as a direct function of the capacitance, while circuit yield varies inversely with surface area. Also, it is desirable that one plate of a capacitor be grounded; a diffused or junction capacitor then can be used, and problems such as pin holes and low voltage breakdown encountered with metal-oxide type capacitors are avoided. A metal-oxide type capacitor always has associated therewith a diffused shunt capacitor to the substrate. Using a capacitor with one side grounded in the circuit design enables us to use the two capacitors in parallel, thus achieving the maximum capacitance for a given area.

It has been suggested that a suitable steering network for an integrated circuit is one comprising first and second transistors having their emitters connected together and by way of a common resistor to a control input terminal. First and second capacitors are connected between a point of reference potential and the bases of the first and second transistors, respectively. Third and fourth transistors are provided for charging either the first or second capacitor, respectively, depending upon the information signals to be steered, when the voltage at the control input terminal has a first value. When the voltage at the control input terminal is switched to a second value, the charged transistor is discharged through the emitter-base junction of the associated first or second transistor. Collector current flows in that transistor to one of the flip-flop's input terminals during the discharge period.

Essentially, the first and second transistors serve as capacitance multipliers, whereby capacitors of relatively low value may be employed. The control signal applied at the control input terminal may be a trigger pulse, a shift pulse, or a count pulse, depending upon whether the network is used in a triggerable flip-flop, shift register or counter application.

It is an object of this invention to provide improved steering networks which incorporate the principles of the immediately aforementioned steering network.

It is another object of this invention to provide improved steering networks of the type described which have provision for discharging a charged capacitor in response to a change in input signal conditions during a nonshift or nontrigger period.

It is still another object of the invention to provide, in a steering network of the general type described above, means for preventing a large forward bias across the collector-base junctions of the first and second transistors.

In one suggested steering network, the third and fourth transistors have their collectors coupled to the control input terminal, their emitters coupled to the ungrounded plates of the first and second capacitors, respectively, and their bases coupled to first and second signal-receiving input terminals, respectively. This steering network is improved in one embodiment of my invention by connecting first and second unidirectional conducting means between the ungrounded plates of the first and second capacitors, respectively, and the first and second signal-receiving input terminals, respectively. A further improvement comprises a pair of clamp diodes each connected between the base of a different one of the third and fourth transistors and a different one of the output terminals of the flip-flop. A still further improvement is provided by connecting first and second diodes in the collector circuits of the first and second transistors, respectively, to prevent forward biasing of the collector-base junctions thereof.

In another steering network embodying the invention, the third and fourth transistors are connected in the common collector configuration, their bases are connected to the control input terminal, and their emitters are respectively coupled to the bases of the first and second transistors. Fifth and sixth transistors have their collector-emitter paths connected in circuit across the first and second capacitors, respectively, and input signals to be steered are applied at their respective bases.

In the accompanying drawing, like reference characters denote like components, and:

Figure 1:
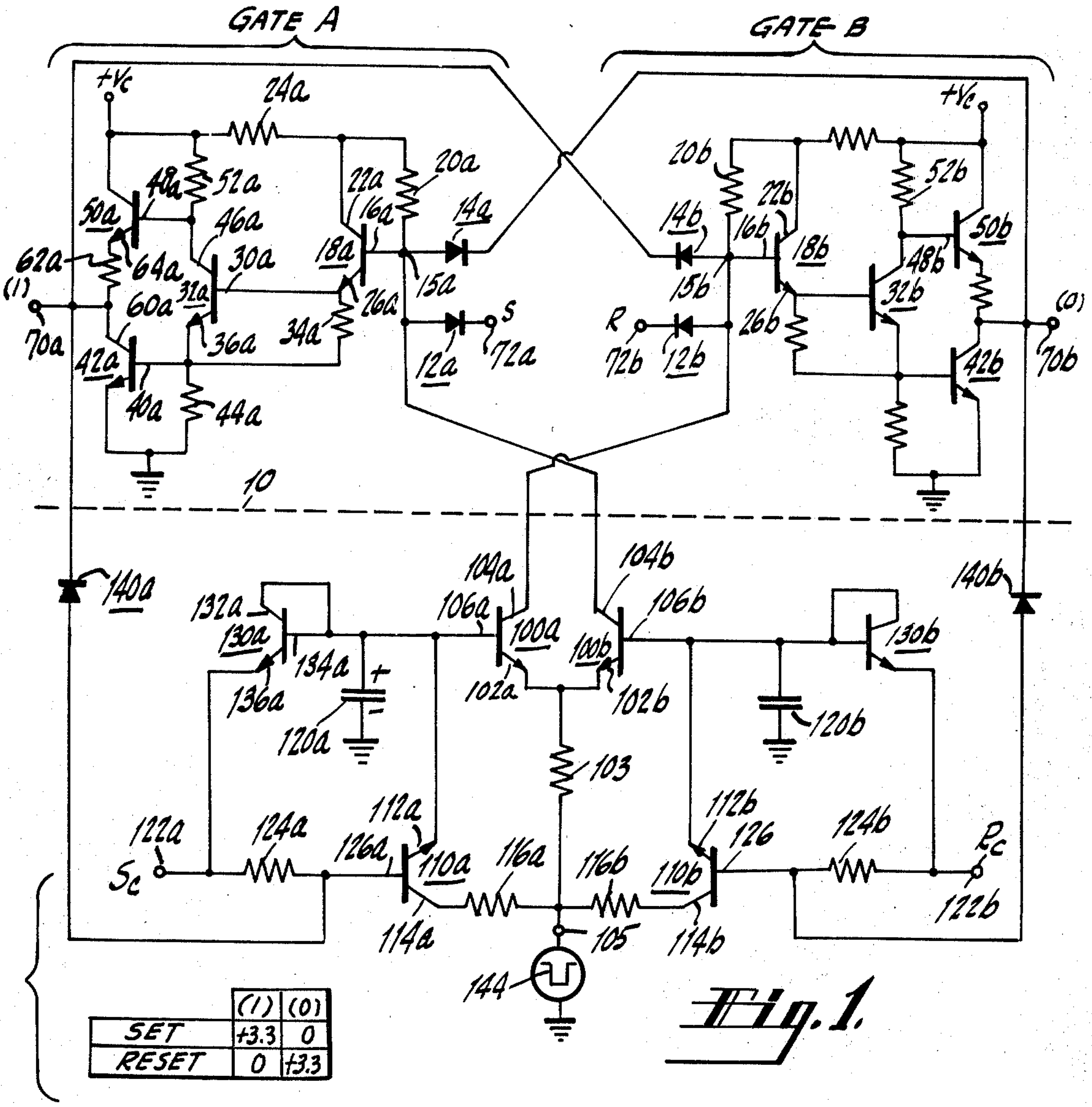
FIG. 1 is a schematic diagram of a flip-flop, and an improved steering network embodying my invention.

The active steering networks of this invention are not limited in their application to use with any one particular type of flip-flop. However, for the purpose of example and completeness of description, the FIG. 1 circuit includes a schematic diagram of one type of flip-flop with which the active steering network may be employed. The flip-flop is located above the dashed line 10 and comprises a pair of gates A, B which are cross-coupled in the usual manner.

Gate A includes a pair of input diodes **12*a*, 14*a* having their anodes connected together at an input junction 15*a* at the base 16*a* of an NPN transistor 18*a*. A resistor 20*a* is connected between the base 16*a* and the collector 22*a*, and a supply resistor 24*a* is connected between collector 22*a* and a source of suitable operating potential, designated $+V_c$. Emitter 26*a* is directly connected to the base 30*a* of another NPN transistor 32*a*, and is connected by way of a resistor 34*a* to the emitter 36*a* of the latter transistor and the base 40*a* of still another NPN transistor 42*a*. A resistor 44*a* is connected between circuit ground and a point common to the base 40a and the emitter 36a. The collector 46a of transistor 32a is connected to the base 48a of an NPN transistor 50a, and is returned to the +$V_c$ source by way of a supply resistor 52a. Transistor 42a has its collector 60a connected by way of a resistor 62a to the emitter 64a of the transistor 50a, whereby the collector-emitter paths of these transistors are connected in series between circuit ground and the +$V_c$ volt source. A first output, designated 1, is derived at a terminal 70a which is connected at the collector 60a. Gate B is identical to gate A, and like components are designated by like reference numerals followed by the letter "b." For operation as a flip-flop, the 1 output terminal 70a is connected to the cathode of the input diode 14b in gate B, and the 0 output terminal 70b of gate B is connected to the cathode of the input diode 14a in gate A. In the operation of the flip-flop, the flip-flop may be switched to the SET state by applying an input signal of suitable value at the input terminal 72a to forward bias diode 12a and to render transistor 18a nonconducting. The voltage at the emitter 26a thereof then has a value close to ground potential, whereby transistors 32a and 42a are rendered nonconducting. The voltage at collector 46a of transistor 32a then rises in a positive direction to render transistor 50a conducting, whereby the 1 output voltage at terminal 70a has its most positive value. This voltage, when fed back to the cathode of input diode 14b, reverse biases the diode. Transistor 18b, in gate B, then is rendered conducting by base current flow supplied through the base bias resistor 20b. With transistor 18b conducting, the voltage at its emitter 26b has a positive value, whereby transistors 32**b *and* 42b are rendered conductive. Sufficient current flows through transistor 32b and its collector resistor 52b to lower the voltage at the base 48b of transistor 50b and thereby decrease conduction in that transistor. With transistor 42b in a conducting state, the 0 output voltage at terminal 70b is close to ground potential. This voltage, when fed back to the cathode of input diode 14a, maintains transistor 18a in a cut-off condition.

The flip-flop may be switched to the RESET state, by external means, by lowering the voltage at input terminal 72b to a value sufficient to cut off the transistor 18b. Alternatively, the flip-flop may be switched from the SET to the RESET state by diverting sufficient current from the base 16b to turn off the transistor 18b. That is to say, if a sufficient amount of the current normally supplied by way of resistor 20b is diverted away from the base 16b, transistor 18b will turn off, the 0 output at terminal 70b will become more positive, and this output will reverse bias input diode 14a and allow transistor 18a in gate A to turn on.

An active steering network which embodies improvements according to my invention as illustrated in FIG. 1 below the dashed line 10. This network includes first and second NPN transistors 100a, 100b having their respective emitters 102a, 102b connected directly in common and by way of a common emitter resistor 103 to a first input terminal 105. The collectors 104a and 104b are coupled, respectively, to the flip-flop input points 15a, 15b at the base electrodes 16b and 16a of the transistors 18b and 18a. Essentially, the resistors 20b and 20a in the base circuits of the latter transistors serve as the collector supply resistors for the transistors 100a and 100b, respectively. Third and fourth NPN transistors 110a and 110b have their emitters 112a and 112b respectively connected at the base electrodes 106a and 106b of the transistors 100a and 100b. Collector 114a is connected by way of a resistor 116a to the control input terminal 105, and the collector 114b of transistor 110b is connected to that input terminal by way of a resistor 116b. An input terminal 122a, designated $S_c$, is coupled by way of a resistor 124a to the base 126a of third transistor 110a. Another input terminal 122b, designated $R_c$ is coupled by way of a resistor 124b to the base 126b of fourth transistor 110b.

A first capacitor 120a has one of its plates directly connected to a point of reference potential, indicated by the conventional symbol for circuit ground. The other plate thereof is connected at a point common to the base 106a of first transistor 100a. In like manner, a second capacitor 120b has one of its plates grounded and has the other plate connected at the base 106b.

According to my invention, a first unidirectional conducting device 130a, e.g., a diode, is connected between input terminal 122a and the ungrounded plate of first capacitor 120a. This diode is illustrated as a transistor 130a having its collector 132a and base 134a tied together and to the base 106a, and having its emitter 136a connected to the input terminal 122a. It will be noted that the easy current flow direction across the base 134a-emitter 136a junction is opposed to the easy current flow direction across the base 106a-emitter 102a junction of first transistor 100a. In a similar manner, e.g., a diode, is connected between input terminal 122b and the ungrounded plate of second capacitor 120b. The diode may be a transistor having its emitter connected to the input terminal 122b, and having its collector and base connected together and to the base of second transistor 100b. First and second other diodes 140a and 140b have their cathodes connected, respectively, to the output terminals 70a and 70b of the flip-flop and having their anodes connected at the bases 126a and 126b, respectively of the third and fourth transistors 110a and 110b. The diodes 130a, 130b, 140a and 140b are of particular importance when steering network is employed in a shift register application, as will be discussed more fully hereinafter.

Figure 2:
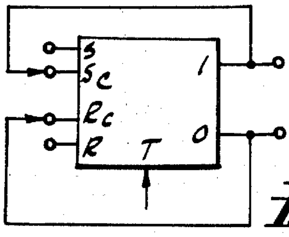
FIG. 2 is a block diagram indicating the input connections to the steering network for a triggerable flip-flop application.

FIG. 2 illustrates the manner in which connections are made in the FIG. 1 circuit for a triggerable flip-flop application. As illustrated in FIG. 2, the 1 output terminal of the flip-flop is connected to the input terminal designated $S_c$, and the 0 output terminal is connected to the input terminal designated $R_c$. Therefore, the FIG. 1 arrangement is operative as a triggerable flip-flop by connecting the output terminals 70a and 70b of the flip-flop to the input terminals 122a and 122b, respectively, of the steering network. In order to more fully understand the operation of the circuit arrangement, let it be assumed that the parameters of the flip-flop are such that the 1 output voltage at output terminal 70a of the flip-flop has a value +3.3 volts when the flip-flop is in the SET state (transistor 18a nonconducting), and has a value of approximately ground potential when the flip-flop is in the RESET state. The voltages at the 0 output terminal 70b are the complements thereof, that is to say, ground potential when the flip-flop is set and +3.3 volts when the flip-flop is reset. Let it be assumed further that the control signal 144 applied at the control input terminal 105 of the steering network has a value of either +3.3 volts or ground potential, corresponding with the output voltages of the flip-flop.

When the flip-flop is in the SET state, the 1 output voltage thereof is +3.3 volts. As indicated in FIG. 2, this voltage is applied at the $S_c$ input terminal 122*a*. Ordinarily, the control voltage at control input terminal 105 has a value of +3.3 volts. With the voltage values indicated, it may be seen that third transistor 110*a* in the steering network is rendered conductive, whereby capacitor 120*a* charges in the polarity direction indicated to a value which is slightly less than +3.3 volts. Due to current flow through the collector resistor 116*a*, third transistor 110*a* saturates during a portion of the charge period. Since the collector saturation current is determined by resistor 116*a*, this resistor has a direct effect on the charge time constant for the capacitor 120*a*. A faster charge time could be provided by eliminating the resistor 116*a*. However, the resistor 116*a* (and the resistor 116*b*) provides immunity to noise spikes at the input terminal 105.

The 0 output voltage of the flip-flop is at ground potential at this time. With ground potential applied at the $R_c$ input terminal 122*b*, transistor 110*b* is biased off, whereby second capacitor 120*b* does not charge through the transistor. In some integrated circuits, the capacitance between the collector and emitter electrodes of a transistor is quite high. If this condition exists for the fourth transistor 110*b*, it would ordinarily be possible for second capacitor 120*b* to become charged through the collector-emitter capacitance of the transistor 110*b* even though the transistor is biased off. However, this result is avoided by the diode 130*b*. Since the voltage at input terminal 122*b* is close to ground potential, diode 130*b* will conduct if the voltage at the ungrounded plate of second capacitor 120*b* becomes more positive than about 0.7 volt, and will limit the voltage across the capacitor to about that value.

When the control voltage at control terminal 105 is lowered to ground potential, transistor 100*a* becomes conducting by virtue of the positive charge on the capacitor 120*a*. A current then flows, in the conventional sense, through the resistor 20*b* in gate B, the collector 104*a*-emitter 102*a* path of transistor 100*a* and common emitter resistor 104. Current is thereby diverted from the base 16*b* of transistor 18*b* and causes this transistor to turn off. Thereupon, transistors 32*b* and 42*b* also turn off and transistor 50*b* (gate B) turns on, raising the 0 output voltage at terminal 70*b* from ground potential to +3.3 volts. This output voltage, when applied over the cross-coupling connection, reverse biases input diode 14*a*, whereupon transistor 18*a* turns on and the 1 output voltage falls from +3.3 volts to ground potential. Thus, the state of the flip-flop is switched when the control input signal 144 is applied.

Capacitor 120*a* discharges when the transistor 100*a* is rendered conductive by the negative going control pulse 144. This capacitor is discharged by the base current in transistor 100*a*, and transistor 100*a* becomes nonconducting when the voltage across the capacitor is reduced to a sufficiently low value. The width or duration of the signal applied to the flip-flop is determined by the time it takes to discharge capacitor 120*a*. In turn, this period is a function of the value of the capacitance, the value of common emitter resistor 103, and the beta of transistor 100*a*. Essentially, the transistor 100*a* multiplies the time constant by a factor equal to the beta of the transistor, because only a fraction of the emitter 102*a* current flows in the base 106*a* circuit to discharge the capacitor. It is this fact which allows the use of a capacitor 120*a* of small value, while still providing a sufficiently long time constant to assure full switching of the flip-flop. The transistor 100*a* can be considered as being a capacitance multiplier.

The third transistor 110*a* is essentially disconnected from capacitor 120*a* when the control voltage 144 is at ground potential. This result is achieved by virtue of the fact that the collector 114*a*-base 126*a* junction becomes forward biased. The voltage at the base 126*a* is determined by the values of the base resistor 124*a*, collector resistor 116*a* and the voltage at input terminal 122*a*. By suitable choice of resistor ratio, the base voltage 126*a* may be about +1 volt when the input voltage at terminal 122*a* is +3.3 volts. With this low base 126*a* voltage, the capacitor 120*a* cannot recharge while the trigger pulse 144 is present. In like manner, fourth transistor 110 is maintained nonconducting even after the flip-flop switches and the voltage at input terminal 122*b* is raised to +3.3 volts. Therefore, capacitor 120*b* cannot charge. Thus, both of the transistors 100*a* and 100*b* are maintained in a nonconducting condition after capacitor 120*a* has discharged, whereby there can be no further triggering of the flip-flop and no race condition can result.

At the termination of the triggering pulse 144, the voltage at control input terminal 105 rises to +3.3 volts. Fourth transistor 110*b* then is rendered conductive and capacitor 120*b* charges through the fourth transistor. The other capacitor 120*a* does not charge at this time because the input voltage at terminal 122*a* is now at ground potential. Thus, third transistor 110*a* is biased off. Diode 130*a* prevents capacitor 120*a* from becoming charged through the emitter-collector capacitance of third transistor 110*a*.

When the next trigger pulse 144 is applied, second transistor 100*b* conducts until the capacitor 120*b* has discharged through the base 106*b*-emitter 102*b* path. During the time that transistor 100*b* conducts, a current flows through the base bias resistor 20*a* (gate A). The value of this current is sufficient, at least during the initial surge, to turn off transistor 18*a*, whereby transistors 32*a* and 42*a* are rendered nonconducting and transistor 50*a* is rendered conducting. THe 1 output voltage at terminal 70*a* then rises from ground potential to +3.3 volts and, when applied at the cathode of input diode 14*b*, back biases this diode and allows transistor 18*b* to conduct. The 0 output voltage at terminal 70*b* then falls from +3.3 volts to ground potential and maintains transistor 18*a* in a nonconducting condition. The flip-flop then has been triggered from the RESET to the SET state.

As discussed above in connection with the triggering from the SET to the RESET state, transistor 110*a* and 110*b* are inoperative to charge the capacitors 120*a* and 120*b*, respectively, while the trigger pulse 144 is present. Therefore, neither of the transistors 100*a* or 100$b$ can conduct after the capacitor 120$b$ is discharged, and there can be no further triggering of the flip-flop, whereby a race condition is avoided.

Figure 3:
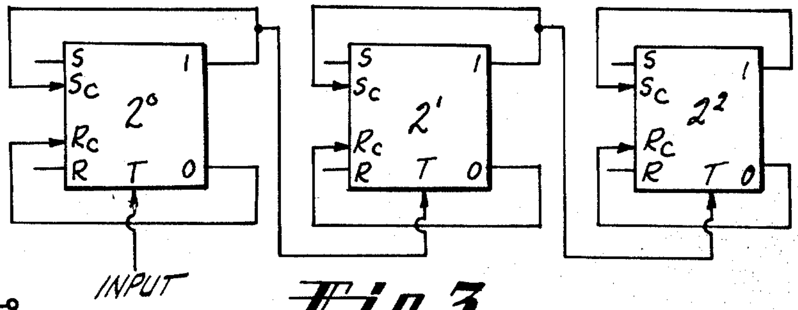
FIG. 3 is a block diagram of a multistage counter illustrating the connections between the flip-flops and steering networks.

For a multistage binary counter application several circuits of the type illustrated in FIG. 1 may be connected in the manner illustrated in block form in FIG. 3. Each individual stage is connected in the same manner as illustrated in FIG. 2 and described hereinabove. In addition, the 1 output terminal of each stage is connected at the trigger input terminal of the next succeeding stage. Thus, the trigger pulse 144 of FIG. 1 is the 1 output of the next preceding stage. Since this voltage falls from +3.3 volts to ground potential when the preceding stage switches from the SET to the RESET state, it can be seen that a stage is triggered only when the preceding stage becomes reset, which is the proper operation for a binary counter.

Figure 5:
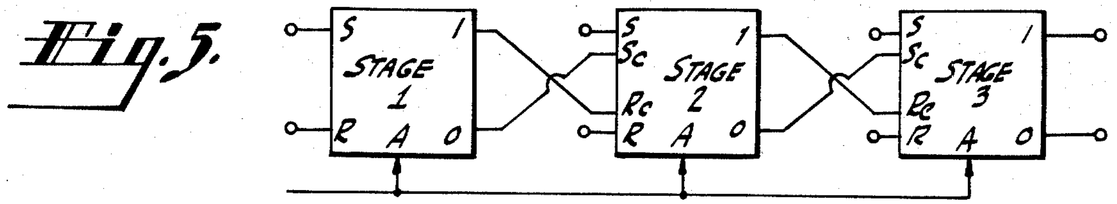
FIG. 5 is a block diagram of a shift register illustrating the connections between the flip-flops and steering networks.

Several circuits of the type illustrated in FIG. 1 may be connected for operation as a shift register in the manner illustrated in FIG. 5. As there illustrated, the 1 output terminal of each stage is connected at the $R_c$ input terminal of the next succeeding stage, and the 0 output terminal of each stage is applied at the $S_c$ input terminal of the next succeeding stage. A common shift pulse is applied at the ADVANCE (A) input terminal of each stage. This terminal is the control input terminal 105 of FIG. 1.

The diodes 140$a$ and 140$b$ (FIG. 1), which are connected between the 1 and 0 output terminals, respectively, and the bases of the transistors 110$a$ and 110$b$, are of importance in the shift register application for the following reason. When the flip-flop is in the RESET state, the voltage at output terminal 70$a$ is at ground potential and the voltage at output terminal 70$b$ is at +3.3 volts. This means that the voltage at the flip-flop input point 15$b$ is at approximately +0.8 volt, the drop across input diode 14$b$. If the preceding stage also is in the RESET state, the voltage applied at input terminal 122$a$ of the steering network has a value of +3.3 volts and the voltage at input terminal 122$b$ is at ground potential. If it were not for the diode 140$a$ circuit, the third transistor 110$a$ would be rendered conductive at this time and transistor 100$a$ would charge in the polarity direction indicated. This charge would have no effect on the flip-flop when the next shift pulse 144 was applied since transistor 100$a$ would be rendered conductive and divert current away from the base of transistor 18$b$. However, transistor 18$b$ is already nonconducting, whereby this current would have no effect.

However, it will be noted that input diode 14$b$ is forward biased at this time. If capacitor 120$a$ were permitted to charge during the nonshift period, the voltage at base electrode 106$a$ of transistor 100$a$ would become several volts positive relative to ground. The base 106$a$-collector 104$a$ junction of the transistor would be forward biased, and a large forward voltage would appear across the series combination of input diode 14$b$ and the collector-base junction of transistor 100$a$. This large forward bias may be sufficient to damage the transistor, and may also put a heavy load on the signal source 144. This condition and result are prevented by the diode 140$a$. With ground potential at the 1 output terminal 70$a$ and +3.3 volts at the input terminal 122$a$, diode 140$a$ is forward biased and clamps the voltage at base 126$a$ at approximately +0.8 volt. This value of base voltage is insufficient to render third transistor 100$a$ conducting, whereby the capacitor 120$a$ cannot charge and the base 106$a$-collector 104$a$ junction of first transistor 100$a$ cannot become forward biased. In like manner, the other diode 140$b$ serves to protect the second transistor 100$b$ when the voltage at the 0 output terminal 70$b$ is at ground potential and the voltage at the $R_c$ input terminal 122$b$ is at +3.3 volts.

The transistors 130$a$ and 130$b$, which are connected as diodes, also are of importance in a shift register application. Consider the conditions which obtain when the voltage at input terminal 122$a$ is +3.3 volts and the voltage at input terminal 122$b$ is at ground potential. Capacitor 120$a$ then charges during the nonshift period. If the information in the shift register is changed by external means, as by applying signals at the input terminals S or R (FIG. 5), the voltage at input terminal 122$a$ may switch from +3.3 volts to ground potential. In the absence of the transistor 130$a$, capacitor 120$a$ could not discharge whereby false triggering would result when the next shift pulse was applied at the control input terminal 105. Transistor 130$a$ prevents this condition by providing a discharge path for the capacitor 120$a$ when the input voltage at terminal 122$a$ is changed from +3.3 volts to ground potential during a nonshift period. In like manner, the other transistor 130$b$ provides a discharge path for capacitor 120$b$ when the input voltage at terminal 122$b$ is changed from +3.3 volts to ground potential. An advantage which obtains from this particular arrangement of transistors 130$a$ and 130$b$ is that the collector to substrate capacitances associated with these two transistors in a monolithic circuit are effectively in parallel with capacitors 120$a$ and 120$b$, respectively. The result is that small value capacitors 120$a$, 120$b$ can be employed.

The active steering network as thus described in detail hereinabove, has the advantage that there is no power dissipation therein during the steady state condition. Also, the capacitors 120$a$ and 120$b$ may have a small value of capacity since the transistors 100$a$ and 100$b$ act as capacitance multipliers. For the same reason, the common emitter resistor 103 may have a relatively low value. This feature is of importance in integrated circuitry because the area required for a capacitor or a resistor is a function of the value of capacity or resistance, and large area circuits result in low circuit yields. Furthermore, the fact that each of the capacitors 120$a$ and 120$b$ has one terminal grounded permits the use of diffused capacitors in an integrated circuit. In the actual circuit, the value of common emitter resistor 103 is selected to provide a discharge time constant of sufficient duration to assure complete triggering of the flip-flop. The values of the collector resistors 116$a$ and 116$b$ may be tailored to provide a sufficiently fast charge time for the capacitors 120$a$ and 120$b$, respectively.

By way of example only, the component values of the steering network may be as follows:

| | |
|---|---|
| Capacitors 120$a$, 120$b$ | 20 $\mu\mu$farads |
| Resistor 103 | 2 kilohms |
| Resistors 116$a$, 116$b$, | 3 kilohms |
| Resistors 124$a$, 124$b$ | 10 kilohms |

Figure 4:
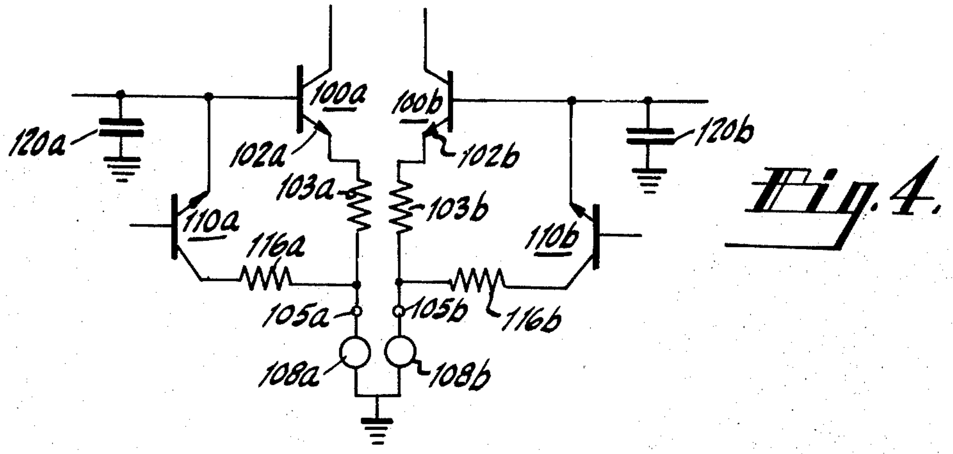
FIG. 4 is a schematic diagram of a modified steering network for set-reset applications.

In addition to its use as an active steering network for flip-flops in the applications mentioned, a circuit embodying the invention also may be used to provide selective setting and resetting of the flip-flop under the control of clock pulses or gating pulses. This is accomplished by modifying the steering network in the manner illustrated in FIG. 4. The modification consists of providing separate emitter resistors 103*a* and 103*b* for the first and second transistors 100*a*, 100*b*, respectively. The lower end of each resistor is connected to a separate input terminal 105*a* or 105*b*, and separate clock sources 108*a* and 108*b* are connected between the respective input terminals 105*a*, 105*b* and circuit ground. In this arrangement, transistor 100*a* is rendered conductive by a clock signal from source 108*a* when its capacitor 120*a* is charged, and transistor 100*b* is rendered conductive by its clock source 108*b* only when its associated capacitor 120*b* is charged. By connecting the input terminals 105*a* and 105*b* together, and employing a single clock source 108*a* or 108*b*, the network operates in the same manner as the FIG. 1 circuit.

In describing the operation of the FIG. 1 circuit, it was mentioned that first capacitor 120*a* charges, in the polarity direction indicated, when the voltage at the base of third transistor 110*a* is positive (+3.3 volts) and the control input voltage at terminal 105 is positive. It was mentioned further that capacitor 120*a* is discharged through the emitter-base junction of first transistor 100*a* when a negative going control pulse 144 is applied. Transistor 100*a* then conducts during the discharge period to switch the state of the flip-flop. This description of the capacitor discharge assumes that third transistor 110*a* (and fourth transistor 110*b*) has a low inverse beta, whereby capacitor 120 is not discharged by inverse emitter current in the third transistor 110*a*. A conventional transistor usually has a sufficiently low inverse beta to prevent such discharge of the capacitor. However, the inverse beta of transistors manufactured in monolithic form according to some processes may be too high to achieve satisfactory operation of the steering network of FIG. 1. The aforementioned problem is avoided in the embodiment of my invention illustrated in FIG. 6.

Figure 6:
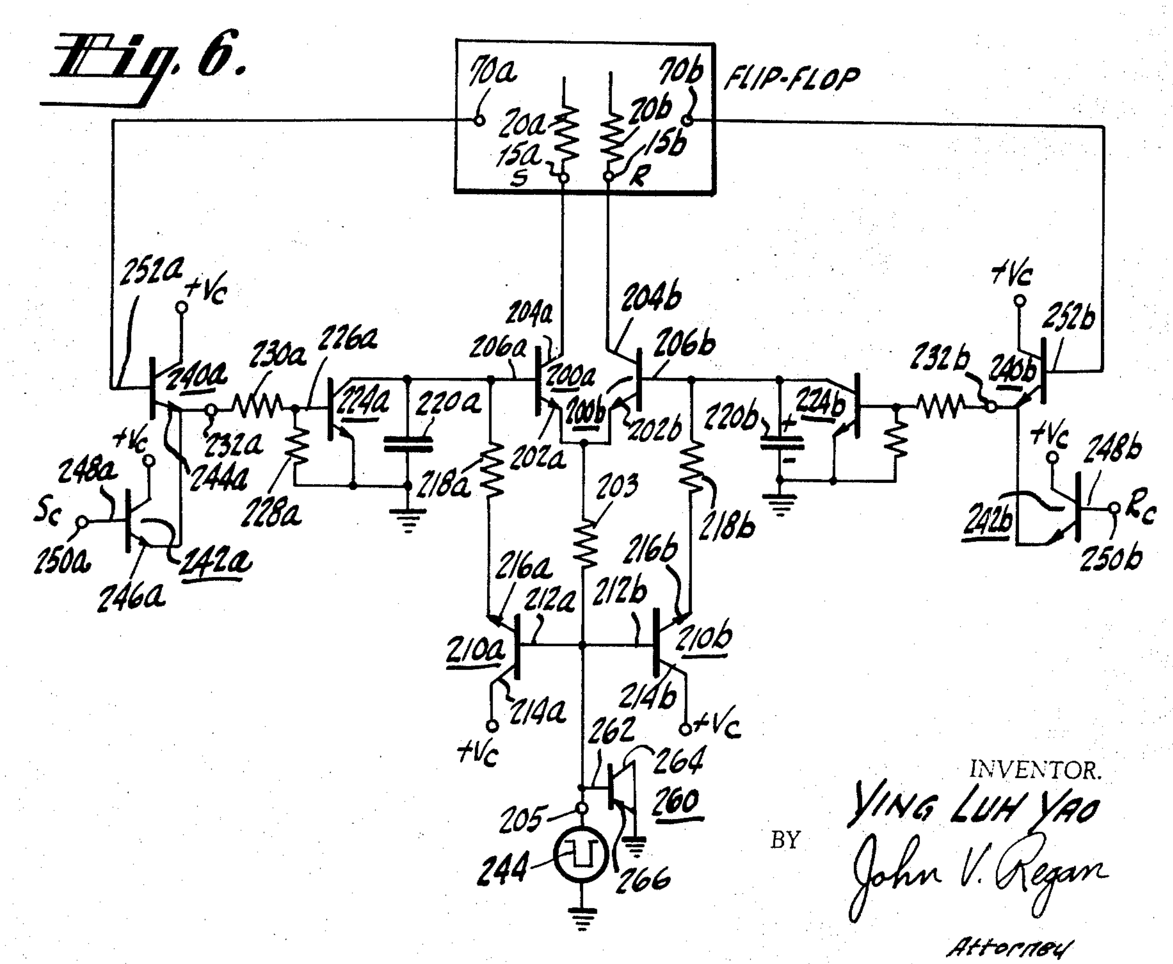
FIG. 6 is a schematic diagram of another steering network embodying the invention.

In FIG. 6, the flip-flop is illustrated in block form, and only those elements of the flip-flop necessary to an understanding of the invention are illustrated in the box. The active steering network comprises first and second NPN transistors 200*a*, 200*b* having their emitter electrodes 202*a*, 200*b* connected in common and by way of a common emitter resistor 203 to the control input terminal 205. The collector 204*a* of first transistor 200*a* is connected to the input point 15*a* of the flip-flop, and the collector 204*b* is connected to the input point 15*b*. It should be noted that these connections are reversed from the connections illustrated in FIG. 1. This is due to a phase inversion which will become more fully apparent as the discussion proceeds. Third and fourth transistors 210*a* and 210*b* have their respective bases 212*a*, 212*b* connected directly to the control input terminal 205 and have their collector electrodes 214*a*, 214*b* connected to the supply source of $+V_c$ volts. The emitter 216*a* of the third transistor is connected by way of a resistor 218*a* to the base of first transistor 200*a*. In a similar manner, the emitter 216*b* is connected by way of a resistor 218*b* to the base of second transistor 200*b*.

A first capacitor 220*a* is connected between the base 206*a* of first transistor 200*a* and circuit ground. A fifth transistor 224*a* has its collector-emitter path in parallel with the capacitor 220*a*, and has its base 226*a* returned to circuit ground by way of a resistor 228*a* and coupled by way of a resistor 230*a* to an input node 232*a*. The input node 232*a* is the output of an emitter follower gate comprising a pair of transistors 240*a* and 242*a* connected in the common collector configuration and having their emitters 244*a* and 246*a* connected together and to the input node 232*a*. The $S_c$ input terminal 250*a* is connected to the base 248*a* of transistor 242*a*, and 1 output terminal 70*a* of the flip-flop is connected to the base 252*a* of transistor 240*a*.

The base input circuitry to second transistor 200*b* is similar to that of the first transistor 200*a*, and the like components are denoted by like reference numerals followed by the letter "*b*." The base 248*b* of transistor 242*b* is connected to the $R_c$ input terminal 250*b*, and the base 252*b* of transistor 240*b* is connected to the 0 output terminal 70*b* of the flip-flop.

The operation of the FIG. 6 circuit will be described for a triggerable flip-flop application. In such an application, no inputs are applied at the $S_c$ and $R_c$ input terminals 250*a*, 250*b*. Let it be assumed that the flip-flop is in the SET state, whereby the 1 output voltage at the flip-flop terminal 70*a* has a value of +3.3 volts. This voltage is sufficiently positive to forward bias the emitter-base junction of transistor 240*a*, whereby the voltage at input node 232*a* is about +2.5 volts. Fifth transistor 224*a* then is biased into saturation and provides a very low impedance path across the terminals of the first capacitor 220*a*. When the control input voltage 244 is at its high level (about +3.3 volts) third transistor 210*a* is biased into conduction, and current flows, in the conventional sense, from the $+V_c$ source through transistor 210*a*, resistor 218*a* and transistor 224*a* to circuit ground. First capacitor 220*a* cannot charge because of the low impedance path thereacross provided by fifth transistor 224*a*.

At the same time, the 0 output voltage of the flip-flop is at ground potential, whereby input transistor 240*b* is nonconducting, and no current flows into the input node 232*b*. Accordingly, transistor 224*b* also is nonconducting, and there is no low impedance path across second capacitor 220*b*. Fourth transistor 210*b* conducts when the control input voltage is at the high level, and capacitor 220*b* charges, in the polarity direction indicated, through resistor 218*b* and the collector-emitter path of fourth transistor 210*b*. The resistor 218*b* determines, in part, the charge time for the capacitor 220*b* and is included in the circuit to provide noise immunity and prevent charging of the capacitor in response to noise spikes at the control input terminal 205.

When the control input voltage 244 is switched from +3.3 volts to ground potential, transistor 210*b* turns off and provides a high impedance path between its collector and emitter. Second transistor 200*b* turns on because of the positive charge on the capacitor 220*b*, and current flows through the transistor to the input point 15*b* of the flip-flop, switching the flip-flop from the SET state to the RESET state. Capacitor 220*b* discharges through the base 206*b*-emitter 202*b* junction of the transistor and the common emitter resistor 203. As in the case of the FIG. 1 circuit, the transistor 200*b* remains conducting until the capacitor 220*b* has discharged, and the discharge time is determined by the value of the capacitor 220*b*, the resistor 203 and the beta of the transistor. Essentially, the transistor 200*b* provides capacitance multiplication.

Because the third and fourth transistors 210*a* and 210*b* are biased in the off condition when the control input voltage is low, neither of the capacitors 220*a*, 220*b* can recharge during the trigger portion of the cycle. Hence, there is no possibility of a race condition and double triggering. When the control voltage again rises to +3.3 volts, transistors 210*a* and 210*b* are again biased into conduction. The 1 output of the flip-flop is now low, whereby transistors 240*a* and 224*a* are nonconducting. First capacitor 220*a* then charges through resistor 218*a* and transistor 210*a*. Since the 0 output of the flip-flop is high, transistors 240*b* and 224*b* conduct. Transistor 224*b* operates in saturation and presents a very low impedance path across second capacitor 220*b*, whereby the capacitor cannot charge. Accordingly, when the next trigger pulse 244 is applied at the control input terminal 205, first transistor 200*a* conducts to discharge first capacitor 220*a* and to supply current at the input point 15*a* of the flip-flop, causing the flip-flop to switch from the RESET to SET state.

In some cases, there may be a ringing on the trigger input line, and the voltage at the control input terminal 205 may become negative relative to ground potential. This condition is to be avoided since otherwise both of the transistors 200*a* and 200*b* may conduct and produce false triggering of the flip-flop. This condition is prevented by connecting a diode 260 between the control input terminal 205 and circuit ground, the diode being poled so as to become conducting when the voltage at the control input terminal 205 tends to fall negative relative to ground. The diode 260 may be a transistor of PNP conductivity having its base 262 connected at the control input terminal 205 and having its collector 264 and emitter 266 connected together and to circuit ground.

The active steering network of FIG. 6 may also be used with the flip-flop in a multistage counter application, in which case the control input terminal 205 is connected at the 1 output terminal of the preceding stage. The network also has application for use in a shift register, in which case connections are made to the $S_c$ and $R_c$ input terminals 250*a* and 250*b* in the manner illustrated in FIG. 5.

By way of example only, the values of the components in the steering network of FIG. 6 may be as follows:

| | |
|---|---|
| RESISTORS | |
| 203 | 2 kilohms |
| 218*a*, 218*b* | 10 kilohms |
| 228*a*, 228*b* | 7.5 kilohms |
| 230*a*, 230*b* | 7.5 kilohms |
| $V_c$ | 4 volts |
| Capacitors 220*a*, 220*b* | 20 $\mu\mu$farads (including stray and other capacitance) |

What is claimed is:

1. In a steering network having first and second transistors each having an input electrode, an output electrode and a common electrode; first and second input terminals; a first resistor connected in circuit between the common electrode of the first transistor and the first input terminal; a second resistor connected in circuit between the common electrode of the second transistor and the second input terminal; first and second output loads connected to the output electrodes of said first and second transistors, respectively; a first capacitor means connected between the input electrode of the first transistor and a point of reference potential; a second capacitor means connected between the input electrode of the second transistor and the point of reference potential; first and second control signal responsive means connected to provide charge paths for the first and second capacitor means, respectively; and means for applying control signals selectively at said first and second input terminals, the improvement comprising: first signal responsive means coupled to the input electrode of the first transistor and being selectively operable to provide a discharge path for the first capacitor means; and a second signal responsive means coupled to the input electrode of the second transistor and being selectively operable to provide a discharge path for the second capacitor means.

2. In a steering network having first and second transistors each having a base, an emitter and a collector; means for connecting first and second output loads at the collectors of the first and second transistors, respectively; a first input terminal; means connecting the emitters of the first and second transistors together and by way of a resistor to the first input terminal; third and fourth transistors having their collectors coupled to the first input terminal and having their emitters coupled to the bases of the first and second transistors, respectively; a first capacitor connected between the base of the first transistor and a point of reference potential; a second capacitor connected between the base of the second transistor and said point of reference potential; second and third input terminals coupled respectively to the bases of the third and fourth transistors; and means for applying a control signal at the first input terminal, the improvement comprising: first unidirectional conducting means connected in circuit between the second input terminal and the base of the first transistor, and having its easy current flow direction opposed to the easy current flow direction across the emitter-base junction of the first transistor; and second unidirectional conducting means connected in circuit between the third input terminal and the base electrode of the second transistor, and having its easy current flow direction opposed to the easy current flow direction across the emitter-base junction of the second transistor.

3. The combination with a flip-flop having first and second input points and corresponding first and second output terminals, of:

first and second transistors each having an emitter, a collector and a base;

means coupling the collectors of the first and second transistors to different ones of the first and second input points of the flip-flop;

a first input terminal;

means connecting the emitters of the first and second transistors in common, and by way of a common emitter resistor to said first input terminal;
third and fourth transistors having their collector electrodes coupled to said first input terminal and having their emitters respectively connected to the bases of the first and second transistors;
a first capacitor connected between the base of the first transistor and a point of reference potential;
a second capacitor connected between the base of the second transistor and said point of reference potential;
second and third input terminals respectively coupled to the bases of the third and fourth transistors;
first unidirectional conducting means connected in circuit between the second input terminal and the base of the first transistor, and having its easy current flow direction opposed to the easy current flow direction across the emitter-base junction of the first transistor;
second unidirectional conducting means connected in circuit between the third input terminal and the base of the second transistor, and having its easy current flow direction opposed to the easy current flow direction across the emitter-base junction of said second transistor; and
means for applying a control signal at said first input terminal.

4. The combination as claimed in claim 3, wherein the first, second, third and fourth transistors are of the same conductivity type, and including first and second diodes respectively coupling the first and second output terminals to the bases of different ones of said third and fourth transistors.

5. The combination as claimed in claim 4, including a second flip-flop having first and second output terminals, and means for coupling the first and second output terminals of the second flip-flop to different ones of said second and third input terminals.

6. The combination comprising:
first and second transistors each having an emitter, a base and a collector;
control input terminal means;
means connecting the emitters of the first and second transistors by way of resistor means to said control input terminal means;
first capacitor means connected between the base of the first transistor and a point of fixed potential;
a second capacitor means connected between the base of the second transistor and said point of fixed potential;
a third transistor having its collector-emitter path connected in a circuit across the terminals of said first capacitor means;
a fourth transistor having its collector-emitter path connected in a circuit across the terminals of said second capacitor means;
first and second input circuit means connected to the bases of said third and fourth transistors, respectively;
means for applying control signals at the control input terminal means;
fifth and sixth transistors connected to provide charge paths for said first and second capacitor means in response to said control signals; and
means for connecting first and second output loads at the collectors of the first and second transistors, respectively.

7. The invention according to claim 6
wherein said control input terminal means includes first and second control input terminals; and
wherein said resistor means includes first and second resistors, wherein said first resistor couples said first control input terminal to the emitter of said first transistor, and said second resistor couples said second control input terminal to the emitter of said second transistor.

8. The invention according to claim 7
wherein first input signal gating means selectively turns said third transistor on and off; and
wherein second input signal gating means selectively turns said fourth transistor on and off.

9. The invention according to claim 6
wherein said fifth and sixth transistors are connected in the common collector configuration and each having a base and an emitter;
wherein means couples the bases of said fifth and sixth transistors to said control input terminals means; and
wherein further means couples the emitters of said fifth and sixth transistors to the bases of said first and second transistors, respectively.

10. The combination as claimed in claim 9, wherein all of the transistors are of the same conductivity type.

11. The combination comprising:
first and second transistors each having an emitter, a base and a collector;
control input terminal means;
means connecting the emitters of the first and second transistors by way of resistor means to the control input terminal means;
third and fourth transistors connected in the common collector configuration and each having a base connected to the control input terminal means, and an emitter;
means coupling the emitters of the third and fourth transistors to the bases of the first and second transistors, respectively;
first capacitor means connected between the base of the first transistor and a point of fixed potential;
second capacitor means connected between the base of the second transistor and said point of fixed potential;
a fifth transistor having it collector-emitter path connected in a circuit across the terminals of said first capacitor means;
a sixth transistor having its collector-emitter path connected in a circuit across the terminals of a second capacitor means;
a seventh transistor connected in the common collector configuration and having its emitter coupled to the base of the fifth transistor;
an eighth transistor connected in the common collector configuration and having its emitter coupled to the base of the sixth transistor;
separate means for applying input signals at the bases of the seventh and eighth transistors;
means for applying a control signal at the control input terminal means; and
means for connecting first and second output loads at the collectors of the first and second transistors.

12. In combination with a flip-flop having first and second input terminals and first and second output terminals, an active steering network comprising:

first and second transistors each having a collector coupled to a different one of said first and second input terminals, an emitter, and a base;

a control input terminal;

means for connecting the emitters of the first and second transistors together and by way of a resistor to said control input terminal;

third and fourth transistors connected in the common collector configuration and having their bases connected to the control input terminal;

means coupling the emitters of the third and fourth transistors to the bases of the first and second transistors, respectively;

a first capacitor connected between the base of the first transistor and a point of reference potential;

a second capacitor connected between the base of the second transistor and said point of reference potential;

fifth and sixth transistors connected in the common emitter configuration and having their collectors respectively coupled to the bases of the first and second transistors;

means for applying a control signal at the control input terminal;

a seventh transistor having one of its emitter and collector electrodes connected to a point of fixed potential and having the other one of its collector and emitter electrodes coupled to the base of the fifth transistor;

an eight transistor having one of its collector and emitter electrodes connected to a point of fixed potential and having the other one of its collector and emitter electrodes coupled to the base of the sixth transistor; and means coupling the first and second output terminals of the flip-flop to the bases of different ones of the seventh and eighth transistors.

13. In combination with a flip-flop having first and second input terminals and first and second output terminals, an active steering network comprising:

first and second transistors each having a collector coupled to a different one of said first and second input terminals, an emitter, and a base;

a control input terminal;

means for connecting the emitters of the first and second transistors together and by way of a resistor to said control input terminal;

third and fourth transistors connected in the common collector configuration and having their bases connected to the control input terminal;

means coupling the emitters of the third and fourth transistors to the bases of the first and second transistors, respectively;

a first capacitor connected between the base of the first transistor and a point of reference potential;

a second capacitor connected between the base of the second transistor and said point of reference potential;

fifth and sixth transistors connected in the common emitter configuration and having their collectors respectively coupled to the bases of the first and second transistors;

means for applying a control signal at the control input terminal;

first and second emitter follower gates having their outputs respectively coupled to the bases of the fifth and sixth transistors;

means coupling the first output terminal of the flip-flop to an input of the first emitter follower gate; and means coupling the second output terminal of the flip-flop to an input of the second emitter follower gate.

14. The combination as claimed in claim 13, wherein all of the recited transistors are of the same conductivity type.

* * * * *